United States Patent
Liu

(10) Patent No.: US 12,112,042 B2
(45) Date of Patent: Oct. 8, 2024

(54) CACHE MIRRORING METHOD

(71) Applicant: Inspur Suzhou Intelligent Technology Co., Ltd., Suzhou (CN)

(72) Inventor: Zhikui Liu, Suzhou (CN)

(73) Assignee: INSPUR SUZHOU INTELLIGENT TECHNOLOGY CO., LTD., Suzhou (CN)

(*) Notice: Subject to any disclaimer, the term of this patent is extended or adjusted under 35 U.S.C. 154(b) by 1 day.

(21) Appl. No.: 17/799,850

(22) PCT Filed: Apr. 27, 2020

(86) PCT No.: PCT/CN2020/087104
§ 371 (c)(1),
(2) Date: Aug. 15, 2022

(87) PCT Pub. No.: WO2021/159608
PCT Pub. Date: Aug. 19, 2021

(65) Prior Publication Data
US 2023/0091817 A1   Mar. 23, 2023

(30) Foreign Application Priority Data
Feb. 13, 2020   (CN) .................. 202010090744.2

(51) Int. Cl.
*G06F 3/06* (2006.01)
(52) U.S. Cl.
CPC .......... *G06F 3/0613* (2013.01); *G06F 3/0604* (2013.01); *G06F 3/0656* (2013.01); *G06F 3/0679* (2013.01)

(58) Field of Classification Search
CPC .... G06F 3/0604; G06F 3/0613; G06F 3/0656; G06F 3/0679
See application file for complete search history.

(56) References Cited

U.S. PATENT DOCUMENTS

| 7,752,173 B1 * | 7/2010 | Gole ................. G06F 11/2097 709/219 |
| 9,916,356 B2 | 3/2018 | Firsov et al. |

(Continued)

FOREIGN PATENT DOCUMENTS

| CN | 105162837 A | 12/2015 |
| CN | 107329704 A | 11/2017 |

(Continued)

OTHER PUBLICATIONS

International Search Report and Written Opinion of corresponding PCT application (PCT/CN2020/087104) mailed Nov. 19, 2020 including English translation (13 pages).

(Continued)

*Primary Examiner* — Eric T Oberly
(74) *Attorney, Agent, or Firm* — Crowell & Moring LLP

(57) ABSTRACT

Provided is a cache mirroring method applied to a master node. A batch of small Input/Output (IO) blocks in an all-flash product may be aggregated into a large IO block via a ProtoBuff, and a corresponding mirroring request is sent to a slave node, so as to achieve cache mirroring. In addition, the present application also provides a cache mirroring apparatus applied to a master node, a cache mirroring method and apparatus applied to a slave node, an all-flash storage device, and an all-flash storage system, the technical effects of which correspond to the technical effects of the method.

16 Claims, 4 Drawing Sheets

(56) References Cited

U.S. PATENT DOCUMENTS

| | | | |
|---|---|---|---|
| 10,298,709 B1* | 5/2019 | Hubbell | H04L 67/5681 |
| 2004/0024971 A1 | 2/2004 | Bogin et al. | |
| 2007/0276983 A1* | 11/2007 | Zohar | G06F 3/0635 |
| | | | 711/100 |
| 2010/0205367 A1* | 8/2010 | Ehrlich | G06F 12/0804 |
| | | | 711/135 |
| 2014/0136808 A1* | 5/2014 | Colgrove | G06F 3/06 |
| | | | 711/168 |
| 2015/0089185 A1 | 3/2015 | Brandyberry et al. | |
| 2017/0177221 A1* | 6/2017 | Trehan | H04L 67/1097 |
| 2020/0204527 A1* | 6/2020 | Vass | G06F 21/10 |
| 2020/0374106 A1* | 11/2020 | Padmanabhan | H04L 9/0894 |

FOREIGN PATENT DOCUMENTS

| | | |
|---|---|---|
| CN | 108399050 A | 8/2018 |
| CN | 109766363 A | 5/2019 |
| CN | 110059004 A | 7/2019 |
| CN | 110362401 | 10/2019 |
| CN | 110673798 A | 1/2020 |

OTHER PUBLICATIONS

First Office Action of corresponding CN priority application (CN202010090744.2) Dec. 9, 2020 including English translation (13 pages).

Search report of corresponding CN priority application (CN202010090744.2) Nov. 30, 2020 (1 page).

Second Office Action of corresponding CN priority application (CN202010090744.2) May 25, 2021 including English translation (16 pages).

Supplementary search report of corresponding CN priority application (CN202010090744.2) May 18, 2021 (1 page).

Guan Zenghui et.al. Mirror cache, "Architecture analysis and practive of OpenStack[M]", pp. 293-295, Dec. 31, 2018 including English translation (4 pages).

Notification to Grant Patent Right for Invention of corresponding CN priority application (CN202010090744.2) dated Aug. 25, 2021 inlcuding English Translation (3 pages).

* cited by examiner

CACHE MIRRORING METHOD

This application is the national phase application of International Patent Application No. PCT/CN2020/087104, filed Apr. 27, 2020, which claims priority to Chinese Patent Application No. 202010090744.2, filed on Feb. 13, 2020, in China National Intellectual Property Administration and entitled "Protocol Buffer-Based Cache Mirroring Method", the contents of each of which are hereby incorporated by reference in their entirety.

FIELD

The present application relates to the technical field of computers, and particularly to a cache mirroring method and apparatus applied to a master node, a cache mirroring method and apparatus applied to a slave node, an all-flash storage device, and an all-flash storage system.

BACKGROUND

In conventional storage systems, cache mirroring is implemented in Input/Output (IO) block units. For example, in a typical dual-controller scenario, a node sends N mirroring requests to a correspondent node when receiving N IO requests.

In an emerging all-flash product, a logging flush mode is used, so the following changes are introduced: metadata IO blocks are all small IO blocks (such as 512 bytes); there are many small IO blocks; and a large number of small IO blocks are explosive and have a great impact on other modules.

It can be seen that, in an all-flash product, a conventional cache mirroring solution may cause frequent interaction and task scheduling between nodes, severely affecting the performance of a storage system.

SUMMARY

An objective of the present application is to provide a cache mirroring method and apparatus applied to a master node, a cache mirroring method and apparatus applied to a slave node, an all-flash storage device, and an all-flash storage system, thereby solving the problem that the performance of a storage system is reduced by frequent interaction and task scheduling between nodes in a conventional cache mirroring solution in an all-flash product. Some solutions are as follows. In a first aspect, the present application provides a cache mirroring method, applied to a master node, . . . including:
  receiving IO requests;
  determining an IO request set satisfying a preset aggregation condition;
  performing a structuralization process and an aggregation process on each IO request in the IO request set to obtain structuralized data;
  performing ProtoBuff serialization on the structuralized data to obtain binary data;
  generating, according to the binary data, and sending a single mirroring request to a slave node, so as to implement cache mirroring.

In some embodiments, the determining an IO request set satisfying a preset aggregation condition includes:
  determining whether a number of currently received IO requests reaches a preset number threshold;
  if YES, determining the currently received IO requests as the IO request set.

In some embodiments, after the determining whether a number of currently received IO requests reaches a preset number threshold, the method further includes:
  if the number of currently received IO requests does not reach the preset number threshold, determining whether a time period in which no new IO request is received exceeds a preset time threshold;
  if YES, determining the currently received IO requests as the IO request set.

In some embodiments, the performing a structuralization process and an aggregation process on each IO request in the IO request set to obtain structuralized data includes:
  storing a data flush position and data payload of each IO request in the IO request set to an array of structs.

In some embodiments, before the storing a data flush position and data payload of each IO request in the IO request set to an array of structs, the method further includes:
  creating the array of structs, in which the array of structs includes multiple structs, the struct includes a first member and a second member, the first member is configured to store the data flush position of the IO request, and the second member is configured to store the data payload of the IO request.

In some embodiments, the IO request is a metadata IO request.

In a second aspect, the present application provides a cache mirroring apparatus, applied to a master node and including:
  an IO request receiving module, configured to receive IO requests;
  a set determination module, configured to determine an IO request set satisfying a preset aggregation condition;
  an IO request aggregation module 303, configured to perform a structuralization process and an aggregation process on each IO request in the IO request set to obtain structuralized data;
  a serialization module, configured to perform ProtoBuff serialization on the structuralized data to obtain binary data;
  a mirroring request sending module, configured to generate, according to the binary data, and send a single mirroring request to a slave node, so as to implement cache mirroring.

In a third aspect, the present application provides a cache mirroring method, applied to a slave node and including:
  receiving a single mirroring request sent by a master node;
  performing ProtoBuff deserialization on binary data contained in the mirroring request to obtain structuralized data, the structuralized data including mirrored data of multiple IO requests satisfying a preset aggregation condition; and
  storing the mirrored data to a local cache.

In some embodiments, the performing ProtoBuff deserialization on binary data contained in the mirroring request to obtain structuralized data, the structuralized data including mirrored data of multiple IO requests satisfying a preset aggregation condition, includes:
  performing ProtoBuff deserialization on the binary data contained in the mirroring request to obtain an array of structs, in which the array of structs includes data flush positions and data payloads of the multiple IO requests satisfying the preset aggregation condition.

In some embodiments, the storing the mirrored data to a local cache includes:

merging the corresponding data payloads to the local cache according to the data flush positions in the array of structs.

In a fourth aspect, the present application provides a cache mirroring apparatus, applied to a slave node and including:

a mirroring request receiving module, configured to receive a single mirroring request sent by a master node;

a deserialization module, configured to perform ProtoBuff deserialization on binary data contained in the mirroring request to obtain structuralized data, in which the structuralized data includes mirrored data of multiple IO requests satisfying a preset aggregation condition;

a cache module, configured to store the mirrored data to a local cache.

In a fifth aspect, the present application provides an all-flash storage device, including:

a memory, configured to store a computer program;

a processor, configured to execute the computer program to implement the steps of the cache mirroring method applied to a master node as described above, or, implement the steps of the cache mirroring method applied to a slave node as described above.

In a sixth aspect, the present application provides an all-flash storage system, including the cache mirroring apparatus applied to a master node as described above and further including the cache mirroring apparatus applied to a slave node as described above.

The present application provides a cache mirroring method applied to a master node, including: receiving IO requests; determining an IO request set satisfying a preset aggregation condition; performing a structuralization process and an aggregation process on each IO request in the IO request set to obtain structuralized data; performing ProtoBuff serialization on the structuralized data to obtain binary data; and generating, according to the binary data, and sending a single mirroring request to a slave node, so as to implement cache mirroring. It can be seen that, according to the method, a batch of small IO blocks in an all-flash product may be aggregated into a large IO block via a ProtoBuff, and a corresponding mirroring request is sent to the slave node, so as to achieve cache mirroring. Therefore, frequencies of IO interaction and task scheduling between the master node and the slave node may be greatly reduced, and the performance of a storage system is remarkably improved.

In addition, the present application also provides a cache mirroring apparatus applied to a master node, a cache mirroring method and apparatus applied to a slave node, an all-flash storage device, and an all-flash storage system, the technical effects of which correspond to the technical effects of the method. Elaborations are omitted herein.

BRIEF DESCRIPTION OF THE DRAWINGS

In order to describe the technical solutions in the embodiments of the present application or the conventional art more clearly, the drawings needed to be used in descriptions about the embodiments or the conventional art will be simply introduced below. It is apparent that the drawings described below are merely some embodiments of the present application. Other drawings may further be obtained by those of ordinary skill in the art according to these drawings without creative work.

DETAILED DESCRIPTION

In order to enable those skilled in the art to better understand the solution of the present application, the present application will be further described in detail below with reference to the accompanying drawings and embodiments. Clearly, the described embodiments are not all embodiments but only part of embodiments of the present application. Based on the embodiments of the present application, all other embodiments obtained by those skilled in the art without creative work shall fall within the protection scope of the present application.

At present, cache mirroring is implemented between nodes of a storage system in IO block units. That is, a master node needs to send a mirroring request to a slave node every time when receiving an IO request. In an all-flash product, IO blocks are all small IO blocks, and there are many such small IO blocks that are explosive. Therefore, a current cache mirroring solution may cause quite frequent interaction and task scheduling between nodes, severely affecting the performance of a storage system.

For the foregoing problem, the present application provides a cache mirroring method and apparatus applied to a master node, a cache mirroring method and apparatus applied to a slave node, an all-flash storage device, and an all-flash storage system. A batch of small IO blocks may be aggregated into a large IO block via a ProtoBuff, and a corresponding mirroring request is sent to a slave node, so as to achieve cache mirroring. Therefore, frequencies of IO interaction and task scheduling between the master node and the slave node may be greatly reduced, and the performance of a storage system is remarkably improved.

Figure 1:
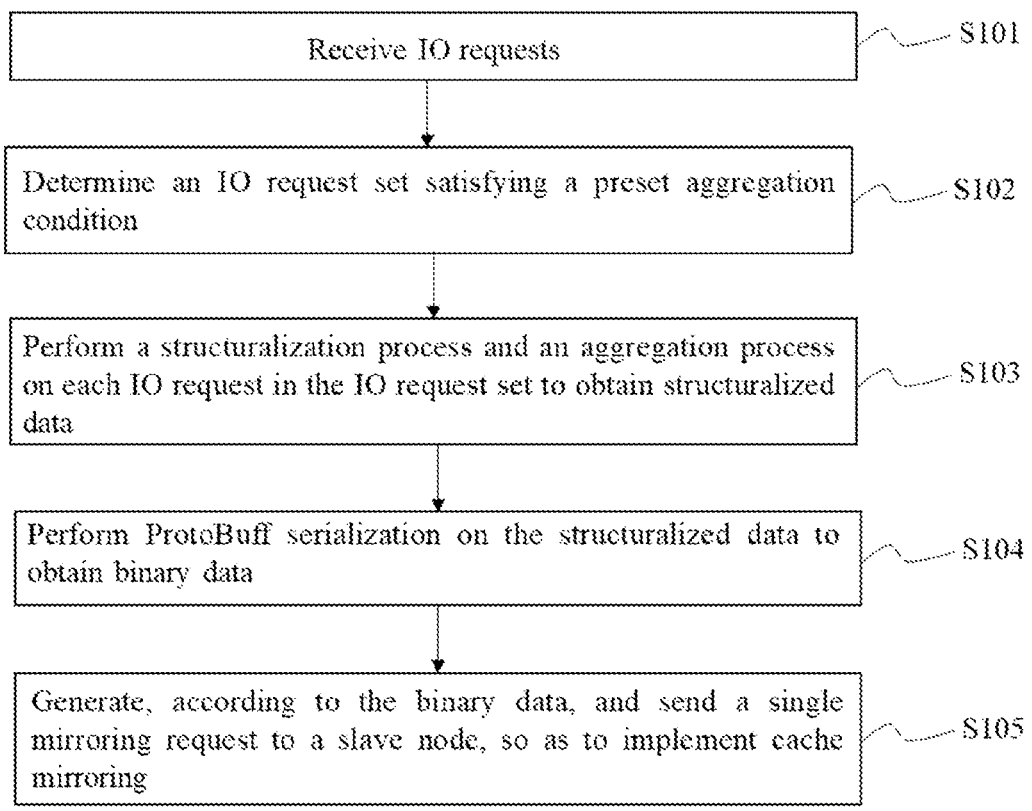
FIG. 1 is an implementation flowchart of embodiment 1 of a cache mirroring method applied to a master node according to the present application.

Embodiment 1 of a cache mirroring method applied to a master node in the present application will be introduced below. Referring to FIG. 1, embodiment 1 includes the following steps.

At S101, IO requests are received.

At S102, an IO request set satisfying a preset aggregation condition is determined.

At S103, a structuralization process and an aggregation process are performed on each IO request in the IO request set to obtain structuralized data.

At S104, ProtoBuff serialization is performed on the structuralized data to obtain binary data.

At S105, a single mirroring request is generated according to the binary data and sent to a slave node, so as to implement cache mirroring.

The present embodiment involves an all-flash storage device-based storage system. The storage system includes a master node and one or more slave nodes. A cache mirroring process of the present embodiment is implemented based on the master node.

Cache mirroring is a cache protection technology commonly used in storage systems. In storage systems, in order to improve the system performance, response information is generally returned when data is yet not written to an underlying storage device after being written to a cache of the node. This write mode is referred to as write back. Although write back ensures the system performance, once abnormal outage occurs to the node, data that is in the cache of the node but yet not written to a disk may be lost. The cache mirroring technology aims to solve this problem. A implementation mode is as follows: when a node performs a write operation, data is not only written to a local cache but also sent to other nodes to create data mirrors.

Therefore, in the present embodiment, the master node, when receiving an IO request, may send a mirroring request to the slave node to implement cache mirroring. In particular, in the present embodiment, the master node does not send a mirroring request to the slave node every time when receiving an IO request, and instead, sends a mirroring request to the slave node after receiving multiple IO requests satisfying a preset aggregation condition.

The preset aggregation condition is preset. The master node continuously receives IO requests until the preset aggregation condition is satisfied, so as to obtain an IO request set including multiple IO requests. As a implementation mode, the preset aggregation condition may be a number limit on IO requests, or a time limit on an IO request receiving process. In addition, considering that the master node is in different idle/busy states in different time periods, the number limit may be set to be relatively small in the idle state and relatively large in the busy state. For example, the master node keeps waiting for receiving IO requests. When the number of currently received IO requests is smaller than a number threshold and no new IO request is received within time exceeding a time threshold, the master node determines that it is idle, and determines the currently received IO requests as the IO request set. Otherwise, the master node continues to receive new IO requests until the number of currently received IO requests reaches the number threshold.

After determining the IO request set, the master node performs an aggregation process on each IO request in the IO request set. In addition, in order to ensure the interaction efficiency between the master node and the slave node, in the present embodiment, a structuralization process is performed on each IO request in the IO request set, to serialize, through a ProtoBuff (Protobuf for short), structuralized data obtained by the structuralization process and the aggregation process.

The ProtoBuff is a convenient and efficient structuralized data storage format capable of serializing and deserializing structuralized data. It functions like extensible Markup Language (XML), with the main advantages of small serialized data and fast data analysis, and is applicable to scenarios with strict requirements for size and speed after data serialization, such as the field of instant messaging. Serialization refers to a process of converting a data structure or object into a binary string so as to be transmitted through a network or written for persistent storage. Deserialization refers to a process of converting a binary string generated by serialization into a data structure or object.

Therefore, the master node may obtain binary data after performing ProtoBuff on the structuralized data. Then, the master node further generates, according to the binary data, and sends a single mirroring request to the salve node, so as to implement cache mirroring.

The slave node performs the following processing process after receiving a mirroring request: performing ProtoBuff deserialization on binary data contained in the mirroring request to obtain structuralized data, the structuralized data including mirrored data of multiple IO requests satisfying a preset aggregation condition; and storing the mirrored data to a local cache.

It can be understood that, when the present embodiment is applied to a dual-controller storage system, the slave node is a correspondent node.

The present embodiment provides a cache mirroring method applied to a master node, including: receiving IO requests; determining an IO request set satisfying a preset aggregation condition; performing a structuralization process and an aggregation process on each IO request in the IO request set to obtain structuralized data; performing ProtoBuff serialization on the structuralized data to obtain binary data; generating, according to the binary data, and sending a single mirroring request to a slave node, so as to implement cache mirroring. It can be seen that, according to the method, a batch of small IO blocks in an all-flash product may be aggregated into a large IO block via a ProtoBuff, and a corresponding mirroring request is sent to the slave node, so as to achieve cache mirroring. Therefore, frequencies of IO interaction and task scheduling between the master node and the slave node may be greatly reduced, and the performance of a storage system is remarkably improved.

Embodiment 2 of a cache mirroring method applied to a master node in the present application will now be introduced in detail. Embodiment 2 is implemented based on embodiment 1, and some extensions are made based on embodiment 1.

In the present embodiment, the IO request refers in particular to a metadata IO request. In the present embodiment, the structuralization process and the aggregation process are performed on the IO request through an array of structs. In the present embodiment, the preset aggregation condition is described with an implementable mode in detail.

Figure 2:
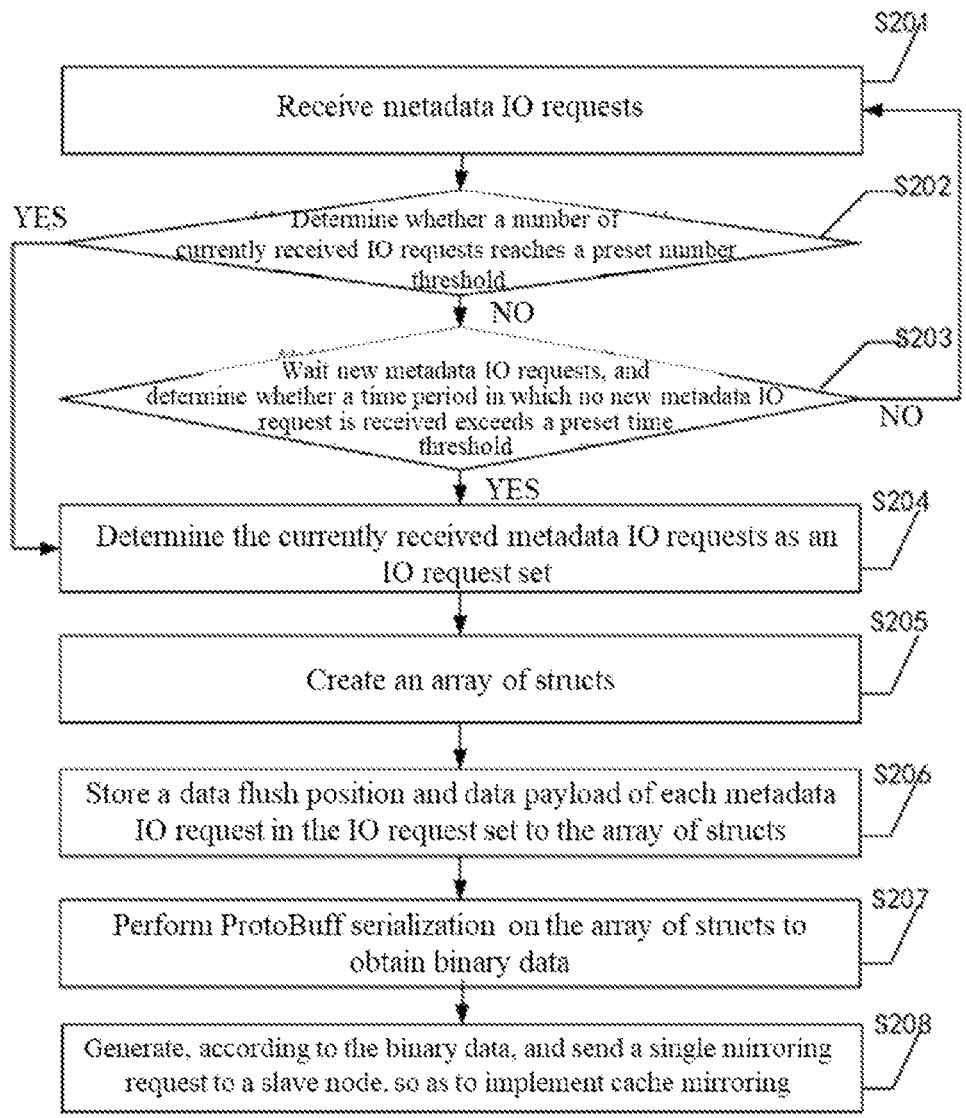
FIG. 2 is an implementation flowchart of embodiment 2 of a cache mirroring method applied to a master node according to the present application.

Referring to FIG. 2, embodiment 2 includes the following steps.

At S201, metadata IO requests are received.

At S202, whether a number of currently received IO requests reaches a preset number threshold is determined. If YES, S204 is performed. Otherwise, S203 is performed.

At S203, new metadata IO requests are awaited, and whether a time period in which no new metadata IO request is received exceeds a preset time threshold is determined. If YES, waiting is stopped, and S204 is performed. Otherwise, waiting is continued, and S201 is performed when a new metadata IO request is received.

At S204, the currently received metadata IO requests are determined as an IO request set.

At S205, an array of structs is created.

The array of structs includes multiple structs. The struct includes a first member and a second member. The first member is configured to store a data flush position of the metadata IO request. The second member is configured to store a data payload of the metadata IO request. The first member is recorded as key, and the second member is recorded as buffer.

In the present embodiment, creation time of the array of structs is not limited, and the operation of creating an array of structs may be performed prior to S201, S202, S203, and S204.

At S206, a data flush position and data payload of each metadata IO request in the IO request set are stored to the array of structs.

At S207, ProtoBuff serialization is performed on the array of structs to obtain binary data.

At S208, a single mirroring request is generated according to the binary data and sent to a slave node, so as to implement cache mirroring.

In the present embodiment, the preset time threshold and the preset number threshold are preset as a preset aggregation condition. The master node receives metadata IO requests, and records a number of currently received metadata IO requests. When the number reaches the preset number threshold, the currently received metadata IO requests are determined as an IO request set. When the number does not reach the preset number threshold, and no new metadata IO request is received within time exceeding the preset time threshold, the currently received metadata IO requests are determined as an IO request set. Example values of the preset time threshold and the preset number threshold may be independently set as required by a practical scenario. No limits are made thereto in the present embodiment.

A cache mirroring apparatus applied to a master node in the embodiments of the present application will now be introduced. The cache mirroring apparatus applied to a master node described below may make corresponding references mutually with the cache mirroring method applied to a master node described above.

Figure 3:
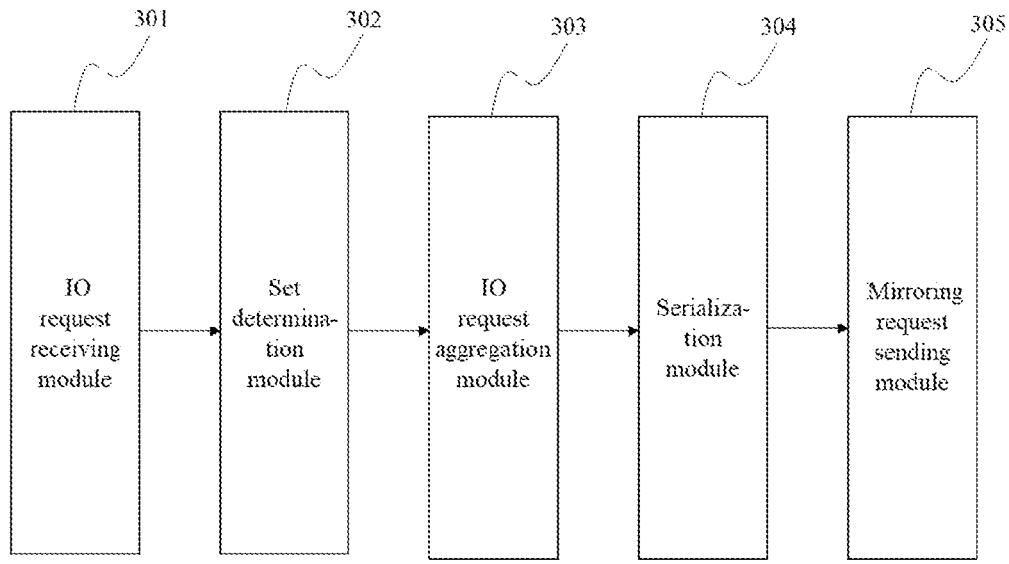
FIG. 3 is a functional block diagram of an embodiment of a cache mirroring apparatus applied to a master node according to the present application.

As shown in FIG. 3, the cache mirroring apparatus includes:
- an IO request receiving module 301, configured to receive IO requests;
- a set determination module 302, configured to determine an IO request set satisfying a preset aggregation condition;
- an IO request aggregation module 303, configured to perform a structuralization process and an aggregation process on each IO request in the IO request set to obtain structuralized data;
- a serialization module 304, configured to perform ProtoBuff serialization on the structuralized data to obtain binary data;
- a mirroring request sending module 305, configured to generate, according to the binary data, and send a single mirroring request to a slave node, so as to implement cache mirroring.

In some embodiments, the set determination module is configured to:
- determine whether a number of currently received IO requests reaches a preset number threshold, and if YES, determine the currently received IO requests as the IO request set.

In some embodiments, the set determination module is further configured to: if the number of currently received IO requests does not reach the preset number threshold, determine whether a time period in which no new IO request is received exceeds a preset time threshold, and if YES, determine the currently received IO requests as the IO request set.

In some embodiments, the IO request aggregation module is configured to:
- store a data flush position and data payload of each IO request in the IO request set to an array of structs.

In some embodiments, the apparatus further includes:
- an array of structs creation module, configured to create the array of structs, in which the array of structs includes multiple structures, the structure includes a first member and a second member, the first member is configured to store the data flush position of the IO request, and the second member is configured to store the data payload of the IO request.

In some embodiments, the IO request is a metadata IO request.

The cache mirroring apparatus applied to a master node in the present embodiment is configured to implement the cache mirroring method applied to a master node, and thus implementation modes in the apparatus may refer to the embodiments of the above cache mirroring method applied to a master node. For example, the IO request receiving module 301, the set determination module 302, the IO request aggregation module 303, the serialization module 304, and the mirroring request sending module 305 are configured to implement steps S101, S102, S103, S104, and S105 in the cache mirroring method applied to a master node. Therefore, the implementation modes may refer to the descriptions about each corresponding embodiment, and will not be introduced herein.

In addition, the cache mirroring apparatus applied to a master node in the present embodiment is configured to implement the cache mirroring method applied to a master node, and thus effects thereof correspond to those of the method, and will not be elaborated herein.

Figure 4:
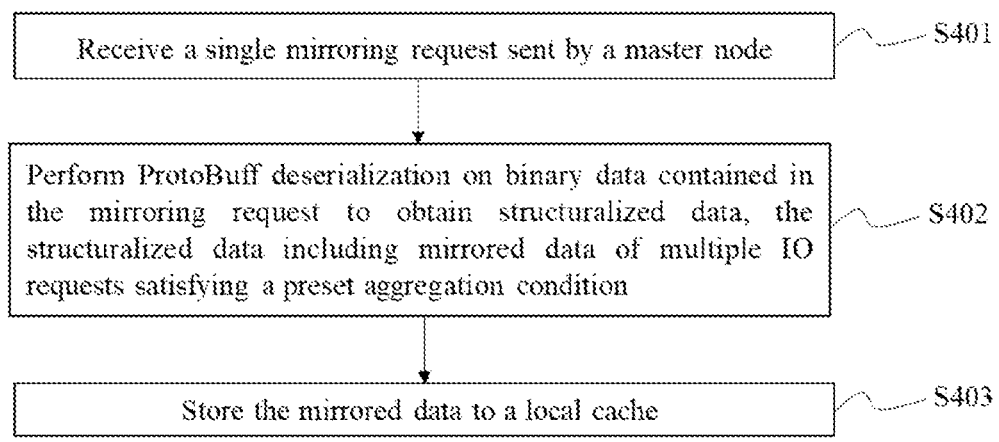
FIG. 4 is an implementation flowchart of an embodiment of a cache mirroring method applied to a slave node according to the present application.

An embodiment of a cache mirroring method applied to a slave node in the present application will be introduced below. Referring to FIG. 4, the embodiment includes the following steps.

At S401, a single mirroring request sent by a master node is received.

At S402, ProtoBuff deserialization is performed on binary data contained in the mirroring request to obtain structuralized data, the structuralized data including mirrored data of multiple IO requests satisfying a preset aggregation condition.

At S403, the mirrored data is stored to a local cache.

As a implementation mode, the structuralized data may be an array of structs, and the array of structs includes data flush positions and data payloads of the multiple IO requests satisfying the preset aggregation condition.

Correspondingly, the step that the mirrored data is stored to a local cache includes: merging the corresponding data payloads to the local cache according to the data flush positions in the array of structs.

The present embodiment provides a cache mirroring method applied to a slave node, including: receiving a single mirroring request sent by a master node; performing ProtoBuff deserialization on binary data contained in the mirroring request to obtain structuralized data, in which the structuralized data includes mirrored data of multiple IO requests satisfying a preset aggregation condition; storing the mirrored data to a local cache. It can be seen that, according to the method, binary data contained in a mirroring request may be deserialized via a ProtoBuff, thereby obtaining mirrored data corresponding to multiple IO requests of the master node side and implementing cache mirroring. Therefore, according to the method, cache mirroring of multiple IO requests may be implemented based on a single mirroring request, reducing frequencies of IO interaction and task scheduling with the master node and greatly improving the performance of a storage system.

A cache mirroring apparatus applied to a slave node in the embodiments of the present application will now be introduced. The cache mirroring apparatus applied to a slave node described below may make corresponding references mutually with the cache mirroring method applied to a slave node described above.

Figure 5:
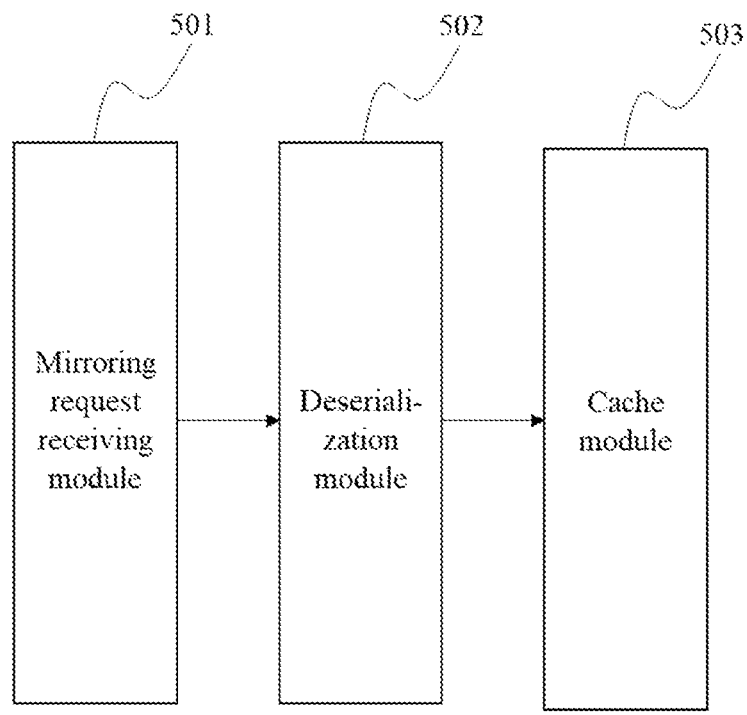
FIG. 5 is a functional block diagram of an embodiment of a cache mirroring apparatus applied to a slave node according to the present application.

As shown in FIG. 5, the cache mirroring apparatus includes:
- a mirroring request receiving module 501, configured to receive a single mirroring request sent by a master node;
- a deserialization module 502, configured to perform ProtoBuff deserialization on binary data contained in the mirroring request to obtain structuralized data, in which the structuralized data includes mirrored data of multiple IO requests satisfying a preset aggregation condition; and
- a cache module 503, configured to store the mirrored data to a local cache.

In some embodiments, the deserialization module is configured to:
- performing ProtoBuff deserialization on the binary data contained in the mirroring request to obtain an array of structs, in which the array of structs includes data flush positions and data payloads of the multiple IO requests satisfying the preset aggregation condition.

In some embodiments, the cache module is configured to:
- merging the corresponding data payloads to the local cache according to the data flush positions in the array of structs.

The cache mirroring apparatus applied to a slave node in the present embodiment is configured to implement the cache mirroring method applied to a slave node, and thus implementation modes in the apparatus may refer to the embodiments of the above cache mirroring method applied to a slave node. For example, the mirroring request receiving module 501, the deserialization module 502, and the cache module 503 are configured to implement steps S401, S402, and S403 in the cache mirroring method applied to a slave node. Therefore, the implementation modes may refer to the descriptions about each corresponding embodiment, and will not be introduced herein.

In addition, the cache mirroring apparatus applied to a slave node in the present embodiment is configured to implement the cache mirroring method applied to a slave node, and thus effects thereof correspond to those of the method, and will not be elaborated herein.

Figure 6:
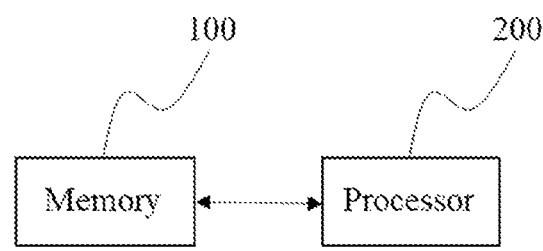
FIG. 6 is a schematic structural diagram of an embodiment of an all-flash storage device according to the present application.

In addition, the present application also provides an all-flash storage device, which, as shown in FIG. 6, includes:
- a memory 100, configured to store a computer program;
- a processor 200, configured to execute the computer program to implement the steps of the cache mirroring method applied to a master node as described above, or, implement the steps of the cache mirroring method applied to a slave node as described above.

The memory 100 includes a readable storage medium of at least one type. The readable storage medium includes a flash memory, a hard disk, a multimedia card, a card memory (such as a Secure Digital (SD) or Data Register (DX) memory), a magnetic memory, a magnetic disk, an optical disk, etc. The memory 100 may be an internal storage unit in some embodiments, such as a hard disk, and in some other embodiments, may be an external storage device, such as a plug-in hard disk, a Smart Media Card (SMC), an SD card, and a flash card. Further, the memory 100 may also include both an internal storage unit and an external storage device. The memory 100 may be configured not only to store application software installed in the all-flash storage device and various data, such as a program code, but also to temporarily store data that has been output or is to be output.

In some embodiments, the processor 200 may be a Central Processing Unit (CPU), a controller, a microcontroller, a microprocessor, or another data processing chip, and is configured to run the program code stored in the memory 100 or process the data, such as executing the program code.

The memory 100 and the processor 200 may be connected with each other through a bus. The bus may be a Peripheral Component Interconnect (PCI) bus, an Extended Industry Standard Architecture (EISA) bus, etc. The bus may be divided into an address bus, a data bus, a control bus, etc. For ease of representation, only one bold line is used for representation in FIG. 6, but it does not indicate that there is only one bus or one type of buses.

Finally, the present application provides an all-flash storage system, including the cache mirroring apparatus applied to a master node as described above and further including the cache mirroring apparatus applied to a slave node as described above.

Each embodiment in the specification is described progressively. Descriptions made in each embodiment focus on differences from the other embodiments, and the same or similar parts in each embodiment refer to the other embodiments. The apparatus disclosed in the embodiments corresponds to the method disclosed in the embodiments, and thus is described relatively briefly, and related parts refer to the descriptions about the method.

The steps of the method or algorithm described in combination with the embodiments disclosed herein may directly be implemented by hardware, a software module executed by the processor, or a combination thereof. The software module may be arranged in a Random Access Memory (RAM), an internal memory, a Read-Only Memory (ROM), an electrically programmable ROM, an electrically erasable programmable ROM, a register, a hard disk, a removable disk, a Compact Disc Read-Only Memory (CD-ROM), or a storage medium in any other form well known in this art.

The solutions provided in the present application are introduced above in detail. The principle and implementation modes of the present application are described herein with specific examples. The above descriptions about the embodiments are only for helping in understanding the method of the present application and the core concept thereof. In addition, those ordinarily skilled in the art may make variations to the specific implementation modes and the application scope according to the concept of the present application. In summary, the contents of the specification should not be understood as limits to the present application.

What is claimed is:

1. A cache mirroring method, being applied to a master node and comprising:
   receiving Input or Output (IO) requests;
   determining an IO request set satisfying a preset aggregation condition;
   performing a structuralization process and an aggregation process on each IO request in the IO request set to obtain structuralized data;
   performing ProtoBuff serialization on the structuralized data to obtain binary data; and
   generating, according to the binary data, and sending a single mirroring request to a slave node, so as to implement cache mirroring;
   wherein the master node and the slave node are devices applied in an all-flash storage system, the IO request is a metadata IO request, and wherein the determining an IO request set satisfying a preset aggregation condition comprises:
  determining, with the master node, whether a number of currently received IO requests reaches a preset number threshold; and
  in response to determining the number of currently received IO requests reaches the preset number threshold, determining, with the master node, the currently received IO requests as the IO request set.

2. The method according to claim 1, wherein after the determining whether a number of currently received IO requests reaches a preset number threshold, the method further comprises:
  in response to determining the number of currently received IO requests not reaching the preset number threshold, determining whether a time period in which no new IO request is received exceeds a preset time threshold; and
  in response to determining the time period in which no new IO request is received exceeding the preset time threshold, determining the currently received IO requests as the IO request set.

3. The method according to claim 1, wherein the performing a structuralization process and an aggregation process on each IO request in the IO request set to obtain structuralized data comprises:
  storing a data flush position and data payload of each IO request in the IO request set to an array of structs.

4. The method according to claim 3, wherein before the storing a data flush position and data payload of each IO request in the IO request set to an array of structs, the method further comprises:
  creating the array of structs, wherein the array of structs comprises multiple structs, the struct comprises a first member and a second member, the first member is configured to store the data flush position of the IO request, and the second member is configured to store the data payload of the IO request.

5. The method according to claim 1, further comprising:
  receiving, with a slave node, a single mirroring request sent by the master node;
  performing, with the slave node, ProtoBuff deserialization on binary data contained in the mirroring request to obtain structuralized data, the structuralized data comprising mirrored data of a plurality of Input or Output (IO) requests satisfying a preset aggregation condition; and
  storing, with the slave node, the mirrored data to a local cache.

6. The method according to claim 5, wherein the performing ProtoBuff deserialization on binary data contained in the mirroring request to obtain structuralized data, the structuralized data comprising mirrored data of multiple IO requests satisfying a preset aggregation condition, comprises:
  performing ProtoBuff deserialization on the binary data contained in the mirroring request to obtain an array of structs, wherein the array of structs comprises data flush positions and data payloads of the multiple IO requests satisfying the preset aggregation condition.

7. The method according to claim 6, wherein the storing the mirrored data to a local cache comprises:
  merging the corresponding data payloads to the local cache according to the data flush positions in the array of structs.

8. The method according to claim 1, wherein the ProtoBuff serialization refers to a process of converting a data structure or object into a binary string.

9. The method according to claim 5, wherein the ProtoBuff deserialization refers to a process of converting a binary string generated by serialization into a data structure or object.

10. An all-flash storage system, comprising a master node and one or more slave nodes;
  wherein the master node is configured to:
    receive IO requests, wherein the IO request is a metadata IO request;
    determine whether a number of currently received IO requests reaches a preset number threshold, and in response to a determination that the number of currently received IO requests reaches the preset number threshold, determine the currently received IO requests as the IO request set;
    perform a structuralization process and an aggregation process on each IO request in the IO request set to obtain structuralized data;
    perform ProtoBuff serialization on the structuralized data to obtain binary data; and
    generate, according to the binary data, and send a single mirroring request to the one or more slave nodes;
  wherein the one or more slave nodes is configured to:
    receive a single mirroring request sent by the master node;
    perform ProtoBuff deserialization on binary data contained in the mirroring request to obtain structuralized data, wherein the structuralized data comprises mirrored data of a plurality of Input or Output (IO) requests satisfying a preset aggregation condition; and
    store the mirrored data to a local cache, so as to implement cache mirroring.

11. The all-flash storage system according to claim 10, wherein after the determination of whether a number of currently received IO requests reaches a preset number threshold, the master node is further configured to:
  in response to a determination that the number of currently received IO requests has not reached the preset number threshold, determine whether a time period in which no new IO request is received exceeds a preset time threshold; and
  in response to a determination that the time period in which no new IO request is received exceeded the preset time threshold, determine the currently received IO requests as the IO request set.

12. The all-flash storage system according to claim 10, wherein the master node, in order to perform the structuralization process and the aggregation process on each IO request in the IO request set to obtain the structuralized data, is configured to:
  store a data flush position and data payload of each IO request in the IO request set to an array of structs.

13. The all-flash storage system according to claim 12, wherein before the store of the data flush position and the data payload of each IO request in the IO request set to the array of structs, the master node is further configured to:
  create the array of structs, wherein the array of structs comprises multiple structs.

14. The all-flash storage system according to claim 13, wherein the struct comprises a first member and a second member, the first member is configured to store the data flush position of the IO request, and the second member is configured to store the data payload of the IO request.

15. The all-flash storage system according to claim 10, wherein the one or more slave nodes, in order to perform ProtoBuff deserialization on the binary data contained in the mirroring request to obtain the structuralized data, is configured to:
- performing the ProtoBuff deserialization on the binary data contained in the mirroring request to obtain an array of structs, wherein the array of structs comprises data flush positions and data payloads of the multiple IO requests satisfying the preset aggregation condition.

16. The all-flash storage system according to claim 15, wherein the one or more slave nodes, in order to store the mirrored data to the local cache, is configured to:
- merge the corresponding data payloads to the local cache according to the data flush positions in the array of structs.

* * * * *